(12) United States Patent
Wilson et al.

(10) Patent No.: US 10,212,596 B2
(45) Date of Patent: Feb. 19, 2019

(54) SYSTEM AND METHOD FOR MIGRATING DATA BETWEEN DEVICES

(71) Applicant: Apple Inc., Cupertino, CA (US)

(72) Inventors: James C. Wilson, San Jose, CA (US); Scott A. Denison, II, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 499 days.

(21) Appl. No.: 14/866,818

(22) Filed: Sep. 25, 2015

(65) Prior Publication Data
US 2016/0360412 A1  Dec. 8, 2016

Related U.S. Application Data

(60) Provisional application No. 62/171,960, filed on Jun. 5, 2015.

(51) Int. Cl.
| | | |
|---|---|---|
| G06F 7/04 | (2006.01) | |
| H04W 12/08 | (2009.01) | |
| H04W 12/04 | (2009.01) | |
| H04L 29/08 | (2006.01) | |

(52) U.S. Cl.
CPC .......... *H04W 12/08* (2013.01); *H04L 67/06* (2013.01); *H04L 67/32* (2013.01); *H04W 12/04* (2013.01)

(58) Field of Classification Search
CPC .. G06F 21/606; G06F 21/604; G06F 21/6218; G06F 21/71; G06F 2221/2141; G06F 2221/2149; G06F 2009/45587; H04L 63/0272; H04L 63/205
See application file for complete search history.

(56) References Cited

U.S. PATENT DOCUMENTS

| | | | | |
|---|---|---|---|---|
| 9,665,602 | B1* | 5/2017 | George | G06F 17/303 |
| 2001/0001870 | A1* | 5/2001 | Ofek | G06F 3/0607 711/112 |
| 2004/0255164 | A1* | 12/2004 | Wesemann | H04L 12/4641 726/15 |
| 2008/0114830 | A1* | 5/2008 | Welingkar | G06F 17/30575 709/203 |
| 2008/0280559 | A1* | 11/2008 | Dandekar | H04W 12/04 455/41.2 |
| 2009/0125984 | A1* | 5/2009 | Bilger | H04L 9/321 726/4 |
| 2012/0094635 | A1* | 4/2012 | Ananthanarayanan | H04W 12/06 455/411 |
| 2013/0152076 | A1* | 6/2013 | Patel | G06F 9/45558 718/1 |
| 2013/0269008 | A1* | 10/2013 | Sheu | H04W 12/04 726/6 |

(Continued)

*Primary Examiner* — Farid Homayounmehr
*Assistant Examiner* — Lizbeth Torres-Diaz
(74) *Attorney, Agent, or Firm* — Dickinson Wright RLLP

(57) ABSTRACT

Disclosed herein is a technique for migrating data between a first device and a second device via a private wireless network hosted by the first device. According to some embodiments, the private wireless network is established based on a code generated by the first device. The second device derives wireless network parameters associated with the private wireless network and connects to the private wireless network. In turn, the data migration can commence when a connection between the first device and the second device has been established.

20 Claims, 6 Drawing Sheets

(56) References Cited

U.S. PATENT DOCUMENTS

| | | | |
|---|---|---|---|
| 2014/0094124 A1* | 4/2014 | Dave | H04W 8/005 |
| | | | 455/41.2 |
| 2014/0098956 A1* | 4/2014 | Hansen | H04L 63/061 |
| | | | 380/270 |
| 2015/0143501 A1* | 5/2015 | Cherukuri | H04L 63/02 |
| | | | 726/11 |
| 2015/0229642 A1* | 8/2015 | Candelaria | H04L 63/102 |
| | | | 709/225 |
| 2016/0360412 A1* | 12/2016 | Wilson | H04W 12/08 |
| 2017/0111474 A1* | 4/2017 | Scott | H04L 63/18 |
| 2017/0177649 A1* | 6/2017 | Badrinarayanan | G06F 3/0617 |

* cited by examiner

SYSTEM AND METHOD FOR MIGRATING DATA BETWEEN DEVICES

CROSS-REFERENCE TO RELATED APPLICATION

The present application claims the benefit of U.S. Provisional Application No. 62/171,960, entitled SYSTEM AND METHOD FOR MIGRATING DATA BETWEEN DEVICES," filed Jun. 5, 2015, the content of which is incorporated herein by reference in its entirety for all purposes.

FIELD

The described embodiments set forth a technique for migrating data between devices over a private wireless network.

BACKGROUND

When a user purchases a new device, the user generally desires to transfer data from his or her old device to the new device. Utilizing a third-party service to transfer the data between the devices can lead to privacy and content ownership issues. Moreover, the data transfer via the third-party service may not be performed in a secure manner. Furthermore, all data relevant to the user may not be transferred seamlessly between the devices, which can degrade the user's overall satisfaction with the process. Consequently, there is a need for a system that is capable of seamlessly migrating data between the devices in a secure manner.

SUMMARY

Representative embodiments set forth herein disclose various techniques for migrating data between a first device and a second device that are owned by a user. In particular, the embodiments set forth various techniques for migrating data between the first and second devices via a private wireless network hosted by the first device. During a setup of the first device, the first device receives a request to migrate data from the second device. In response to the request, the first device generates a code that is used to establish the private wireless network. In turn, a connection is established between the first and second device via the private wireless network and the data is migrated from the second device to the first device over the private wireless network. In this manner, the data can be securely exchanged directly between the first and second devices without requiring a third-party service.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for enabling data migration between a first device running a first operating system and a second device running a second operating system that is different from the first operating system. According to some embodiments, the data migration is carried out over a private wireless network hosted by the first device. The wireless network parameters associated with the private wireless network are derived from a code generated at the first device. When a connection is established between the first and second devices via the private wireless network, the data from the second device can be migrated to the first device.

Accordingly, the techniques described herein provide a mechanism for migrating data between the first and second devices that are owned by a user in a secure manner over the private wireless network. A more detailed discussion of these techniques is set forth below and described in conjunction with FIGS. 1-6, which illustrate detailed diagrams of systems and methods that can be used to implement these techniques.

Figure 1:
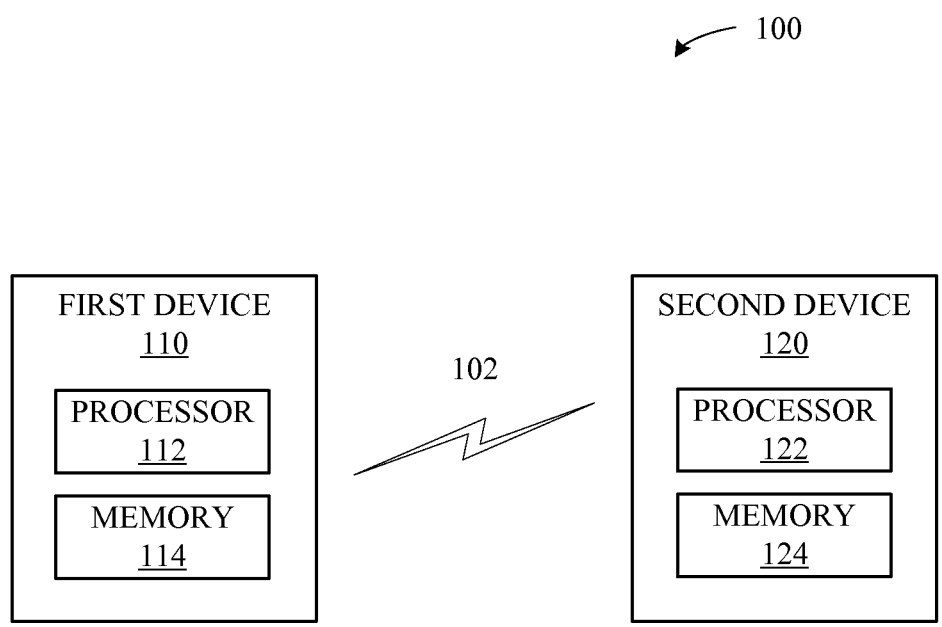
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a first device 110 and a second device 120. In most cases, each of the first device 110 and the second device 120 are owned by a same user, but the embodiments set forth herein are not limited to such a scenario. The first device 110 can represent a mobile computing device (e.g., an iPhone®, an iPad®, or other any other mobile computing device by Apple®) running a first operating system (e.g., a mobile operating system (iOS) by Apple®). The second device 120 can represent a mobile computing device (e.g., a smartphone, a tablet computing device, or any other mobile computing device) running a second operating system (e.g., a mobile operating system (Android™) by Google). The second device 120 can represent a device that supports Application Programming Interfaces (APIs) for gathering data, is capable of connecting to a wireless network, and is capable of running applications provided by a manufacturer of the first device 110 (e.g., Apple®). The first device 110 and the second device 120 are configured to communicate via a wireless network 102 that is hosted by the first device 110. The wireless network 102 can include a Wi-Fi network, a Bluetooth network, a Bluetooth low energy (BT LE) network, or other wireless networks, as would be appreciated.

Although not illustrated in FIG. 1, the processor 112, in conjunction with the memory 114, can implement the first operating system (OS) that is configured to execute various applications (e.g., native OS applications and user applications) on the first device 110. Similarly, the processor 122, in conjunction with the memory 124, can implement the second OS that is configured to execute various applications (e.g., native OS applications and user applications) on the second device 120.

According to some embodiments, the first device 110 represents a new device that is recently purchased or recently acquired by the user and the second device 120 represents a device that the user owns and has been operating over time. The user typically desires to transfer/migrate data (e.g., personal and/or irreplaceable data) from the old device to the new device such that the transition from the old device to the new device is seamless for the user. The data can include, for example, contact information, calendar information, message history, mail, bookmarks, wallpaper settings, information regarding installed applications, pictures/photos, songs, movies, books, and so on.

Figure 2:
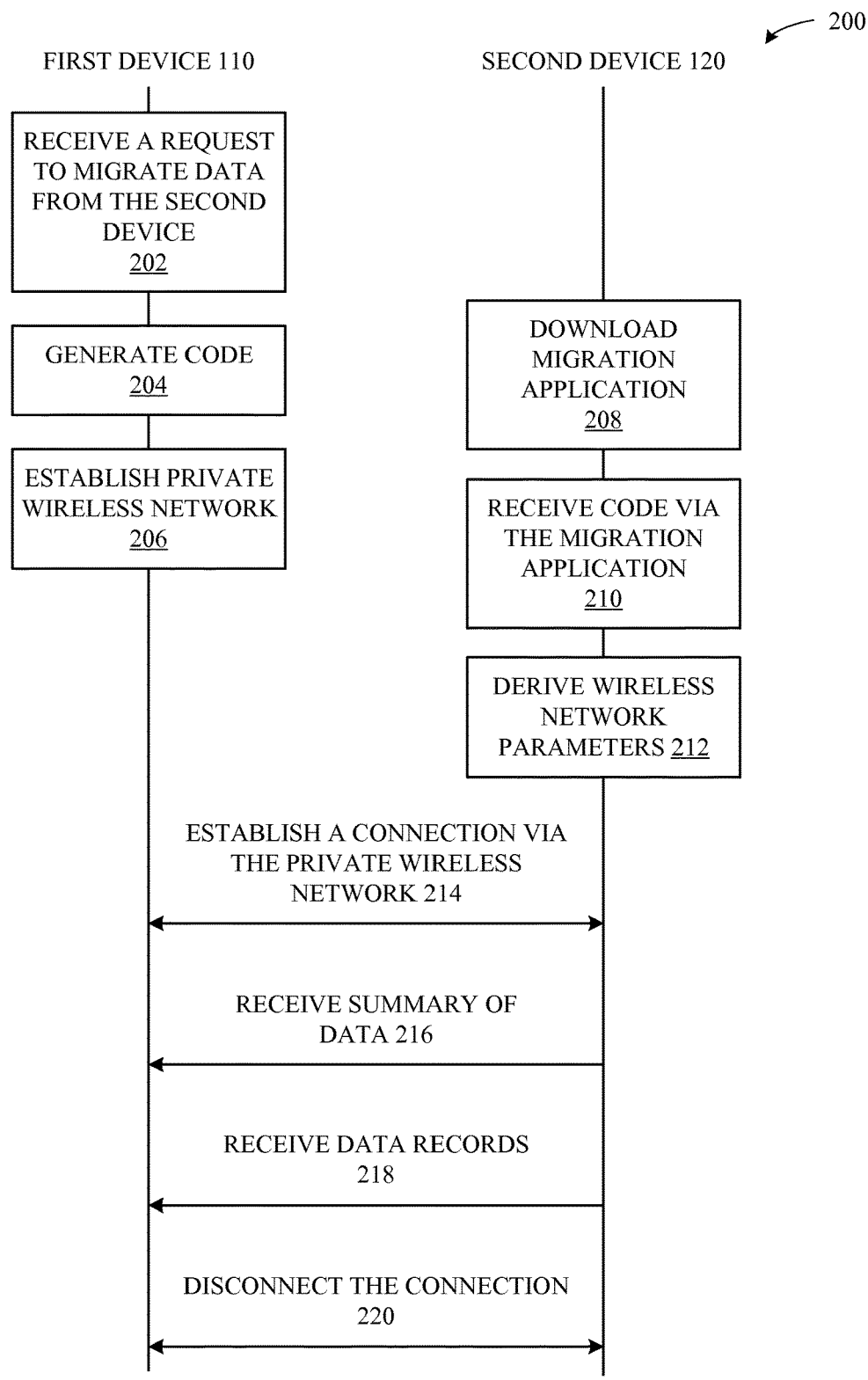
FIG. 2 illustrates a sequence diagram of a method for enabling data migration between the first device and the second device of FIG. 1, according to some embodiments.
Figure 3:
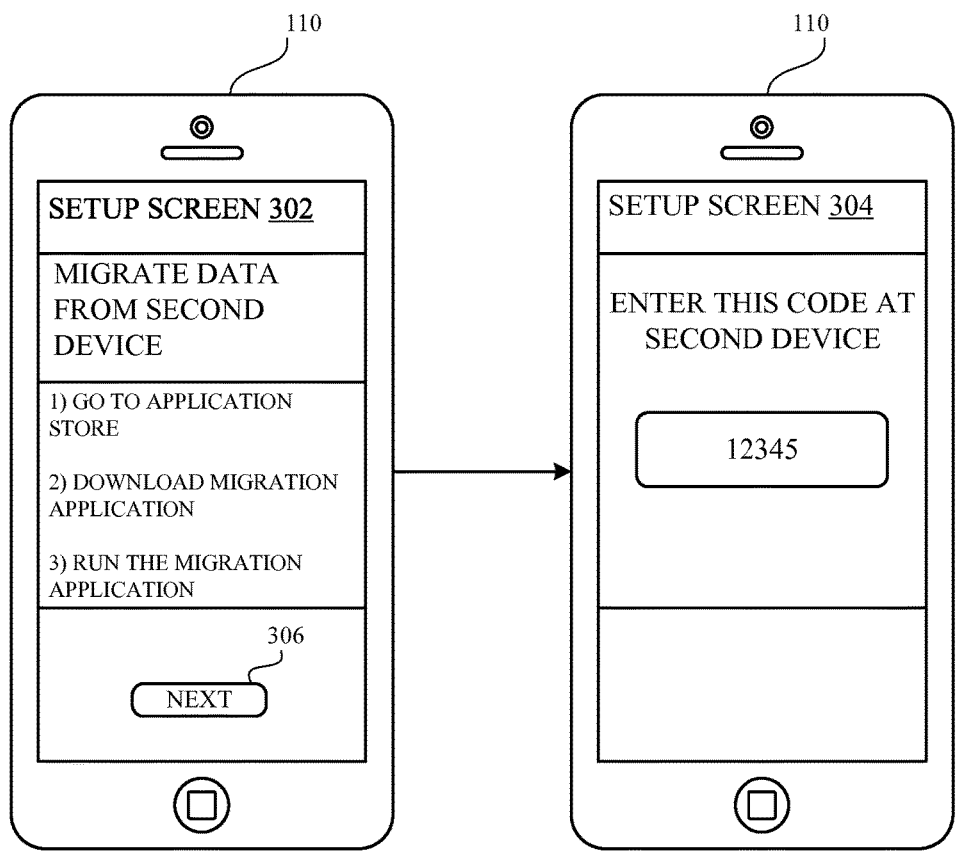
FIG. 3 illustrates a conceptual diagram of an example sequence that involves enabling a user to request data to be migrated from the second device of FIG. 1, according to one embodiment.

FIG. 2 illustrates a sequence diagram of a method 200 for enabling data migration between the first device 110 and the second device 120, according to some embodiments. As shown in FIG. 2, at step 202, the first device 110 receives a request to migrate data from the second device 120. In some embodiments, the request is received during a setup phase of the first device 110 (e.g., when the newly acquired first device 110 is being set up). In some implementations, the user is presented with various options for setting up the first device 110. The user is presented with a user interface (UI) at the first device that enables the user to select how the first device 110 is to be set up. For example, the options can include: 1) set up as a new device, 2) set up by restoring from backup, 3) set up by restoring from a media library (e.g., iTunes® by Apple®), or 4) set up by migrating from the second device 120. When the user selects the fourth option of "migrating from the second device 120 to the first device 110", the user is presented with a setup screen 302 (as illustrated in FIG. 3) in the UI. The setup screen 302 acknowledges the selection of the user and presents text/instructions explaining operations to be carried out at the second device 120. When the user selects the "next" button 306 on the setup screen 302, the user is presented with a setup screen 304 (as illustrated in FIG. 3).

Referring back to FIG. 2, at step 204, the first device 110 generates a code that is utilized to establish a secure private wireless network that is local to and hosted by the first device 110. The code can include a numeric code or any other code that can be securely shared between the first device 110 and the second device 120. For example, the first device 110 can generate a five or a six digit pairing PIN as the code. The code is presented at the setup screen 304 (as shown in FIG. 3) where the user is instructed to enter the generated code at the second device 120. As will be appreciated, other forms of codes and/or pairing information (e.g., QR codes, barcodes, pairing images, etc.) can be generated by the first device 110 for purposes of establishing the secure private wireless network. For example, the first device 110 can generate a QR code that is presented at the setup screen 304 where the user can be instructed to scan the QR code at the second device 120.

The first device 110 establishes the private wireless network, at step 206. In some embodiments, the first device 110 disconnects any existing wireless network connections prior to establishing the private wireless network. In some embodiments, the first device 110 serves as a wireless access point and functions as a hotspot such that the private wireless network hosted by the first device 110 can be utilized for data exchange between the first device 110 and the second device 120. The first device 110 derives, based on the code, a number of wireless network parameters associated with the private wireless network. The wireless network parameters can include a network name (also referred to as a service set identifier (SSID)) and pre-shared key(s) (or other shared secret) used for encryption purposes. In some embodiments, the first device 110 initiates a number of services associated with the private wireless network. For example, the services can include Dynamic Host Configuration Protocol (DHCP) for Internet Protocol (IP) address allocation, multicast Domain Name System (mDNS) for discovery of the first device 110 and the second device 120, and/or other services.

According to some embodiments, the generation of the code is triggered in response to the selection of the "next" button 306 on the setup screen 302, as shown in FIG. 3. In some embodiments, when the user selects the "next" button 306, the first device 110 performs a number of operations, including: 1) generating the code, 2) presenting the code at setup screen 304, 3) establishing the private wireless network, 4) deriving the network name and pre-shared key(s), and 5) initiating the services associated with the private wireless network. At this point, the first device 110 and the second device 120 are not in communication with one another.

Referring to FIG. 3, the setup screen 302 displays instructions explaining the operations to be carried out by the user at the second device 120. Thus, during the setup phase, the user is also instructed to carry out a number of operations at the second device 120, where the operations can include: 1) go to an application store (e.g., Google Play Store or other app store), 2) download a migration application that facilitates the migration of data between the first device 110 and the second device 120, and 3) run the migration application. In some embodiments, the migration application comprises an application provided by the manufacturer of the first device 110 (e.g., Apple®).

Referring back to FIG. 2, at step 208, the migration application is downloaded at the second device 120. When the migration application is executing at the second device 120, the migration application presents a UI at the second device 120 requesting the user to input the code being displayed at the setup screen 304 of the first device 110. At step 210, the migration application at the second device 120 receives the code entered by the user. At step 212, the migration application at the second device 120 also derives the wireless network parameters (e.g., the network name and pre-shared key(s)) of the private wireless network hosted by the first device 110 based on the code.

When the migration application derives the wireless network parameters, the migration application at the second device 120 automatically connects to the private wireless network hosted by the first device 110. In other words, at step 214, a connection is established between the first device 110 and the second device 120 via the private wireless network hosted by the first device 110. When the first device 110 and the second device 120 are on the private wireless network (i.e., are directly connected to one another via the private wireless network), they perform discovery and handshake procedures and exchange a series of keys and certificates (that offer an additional layer of security at transport layer) to ensure that any communication over the private wireless network will be performed in a secure manner. In some embodiments, during the handshake procedures, the first device 110 and the second device 120 can exchange basic information regarding capabilities of the devices (e.g., wireless protocol(s) supported, hardware features, information transfer rate, types of data (e.g., photos, videos, and the like) supported, etc.). Moreover, the first device 110 and the second device 120 can negotiate an appropriate wireless protocol to be used for the data migration process based on the exchange.

At this point, the first device 110 and the second device 120 are able to communicate with one another over the private wireless network. According to some embodiments, the second device 120 can act as a web service (e.g., a RESTful web service, HTTPS web service) that can respond to queries made by the first device 110.

At step 216, a migration phase is initiated where the first device 110 receives a summary of data from the second device 120 over the private wireless network. In some embodiments, the first device 110 queries the second device 120 for the summary of data that is available on the second device 120. In some implementations, the summary of data includes a subset of available data on the second device 120. For example, the subset of available data can include address book data, calendar data, and/or other data that is known to be compatible with the first device 110. The summary of data is received at the first device 110 where determinations are made regarding whether the first device 110 has enough space to store all the data and an amount of time required to perform the migration of the data from the second device 120. In some implementations, in response to a determination that the first device 110 does not have enough space to store all the data from the second device 120, the first device 110 can trigger the second device 120 to present a UI (via the migration application) for selection of particular types of data that the user desires to migrate. For example, the UI can present various options (e.g., songs, photos, videos, etc.) from which the user can make a selection. In this manner, when all the data from the second device 120 cannot be migrated to the first device 110, the user is provided with an option to choose the types of data to be migrated.

At step 218, the first device 110 receives data records associated with the summary of data over the private wireless network. In other words, user data associated with the summary of data is migrated from the second device 120. When the data records are received at the first device 110, the wireless connection between the first device 110 and the second device 120 can be disconnected, at step 220. At this point, the second device 120 can be powered off.

In some embodiments, the data records received from the second device 120 are imported at the first device 110. In other words, the data records are imported and written to a database at the first device 110. For example, the data records are analyzed and particular categories of data records (e.g., pictures, movies, songs, etc.) are imported into appropriate folders on the first device 110. In some embodiments, the migration of data records and synchronization of the database is an atomic process, i.e., when confirmation is obtained that a data record has been imported, any updates to the data record can be performed.

According to some embodiments, when the data records have been imported, a post-migration phase is initiated at the first device 110 where a number of post-migration operations can be performed. The post-migration operations can include account setup, matching of free applications, creating a wish list of applications, and/or other operations. During the account setup operation, any user settings or personalization (e.g., mail, contacts, calendar, wallpaper, etc.) identified from data received from the second device 120 are applied at the first device 110. Also, when a determination is made that the user had a particular account (e.g., a mail account, a chat service account, etc.) at the second device 120, the parameters associated with the account (e.g., account ID) are pre-configured at the first device 110. Thus, the account is already set up for the user at the first device 110 and the user is simply prompted to enter his or her credentials (e.g., password) when the user tries to access/log in the account at the first device 110. Hence, the account setup operations described herein offer a seamless experience to the user as they obviate the need for the user to have to individually re-create accounts at the first device 110 that already are functional on the second device 120. Notably, situations can potentially occur where data records are received at the first device 110 and are uninterpretable by the first device 110. This can occur, for example, when certain data records that are understood by the second device 120 (but not by the first device 110) are mistakenly gathered from the second device 120 and included in the data records that are sent to the first device 110 for processing. Accordingly, to avoid situations where the first device 110 undergoes a failure when encountering such uninterpretable data records, the first device 110 can be configured to implement exception handlers that cause the first device 110 to (1) cease processing an uninterpretable data record, and (2) take a corrective course of action. A corrective course of action can include, for example, ignoring the uninterpretable data record and moving on to a next data record, attempting to identify and process the uninterpretable data record using auxiliary processing techniques, and the like. According to some embodiments, the first device 110 can be configured to maintain a record of the uninterpretable data records that are processed so that they can be presented to a user of the first device 110 during the migration or upon a completion of the migration. In this manner, the user of the first device 110 can review the uninterpretable data records and make his or her own decisions about migrating those records to the first device 110 (e.g., using manual techniques).

According to some embodiments, the user is provided at the first device 110 with an option to download matching applications (i.e., applications that match installed applications on the second device 120) from an application store (e.g., App store by Apple®) at the first device 110. This can be based on, for example, information associated with the applications installed on the second device 120 (e.g., names of applications, developer names, etc.). When the user launches the application store at the first device 110, the user is provided with a recommendation to download free matching applications from the application store. Also, a wish list of applications can be created for the user at the first device 110, where the wish list contains a list of paid applications that the user might be interested in or that the user had installed on the second device 120.

According to some embodiments, the data migration process between the first device 110 and the second device 120 is fault-tolerant. In other words, if the network connection is lost or one of the devices loses power (due to reboot or other reasons), the data migration process is only temporarily interrupted and can be resumed as soon as the network connection or device power is restored. In some implementations, the status of the data migration process is maintained at the first device 110. The first device 110 keeps record of a particular state in the data migration process. The particular state can include information regarding the operation (e.g., transfer of summary of data, transfer of data records, etc.) that was being performed when the connection/device power was lost, an amount of data (e.g., bytes of data, a number of records) that was migrated or imported prior to losing the connection/device power, and the like. In some embodiments, the data migration can be stopped and resumed as desired without affecting the consistency of the migration process.

In some embodiments, the first device 110 and the second device 120 are usable while the data migration process is being carried out. Also, because the data migration occurs over the private wireless network hosted by the first device 110 and is not dependent on the external network environment the devices are in, the devices can continue the data migration (so long as the connection between the devices remains intact). For example, if a user takes the two devices to a retail store where the data migration process over the private wireless network is started, the user can walk out of the retail store with the two devices without interrupting the data migration process as the process does not rely on any third-party network (e.g., retail store network).

In some embodiments, when an existing connection between the first device 110 and the second device 120 is disconnected during the data migration process and the user attempts to restart the data migration process, a different private wireless network can be established based on a new code generated at the first device 110. The second device 120 can derive the wireless network parameters associated with the different private wireless network and establish a new connection. When the first device 110 and the second device 120 discover one another, they are able to identify one another (e.g., based on unique identifiers), and the data migration process can be resumed from the point where the existing connection was disconnected.

Figure 4:
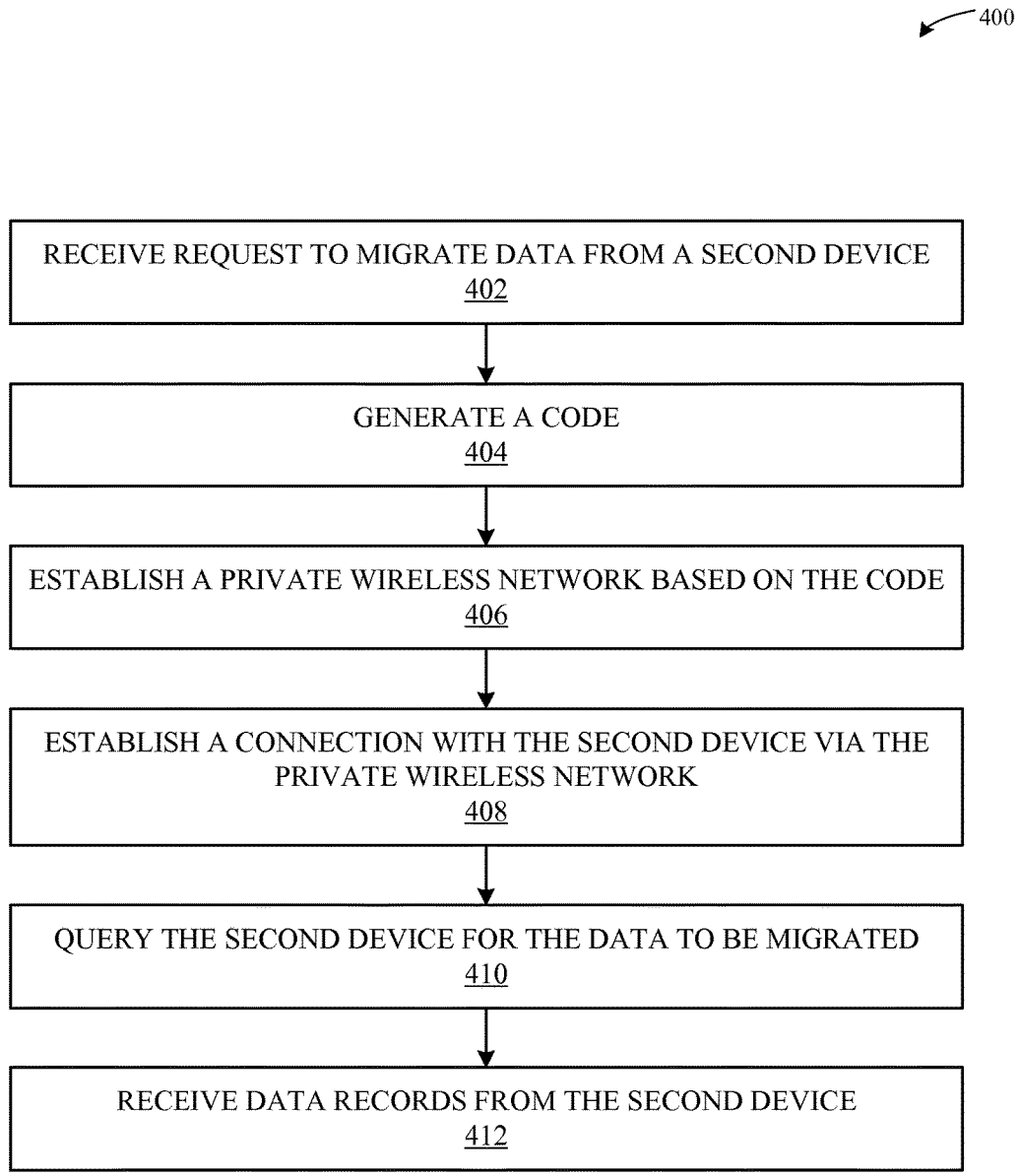
FIG. 4 illustrates a method that is carried out by the first device of FIG. 1, according to one embodiment.

FIG. 4 illustrates a method 400 that is carried out by the first device 110 of FIG. 1, according to one embodiment. As shown, the method 400 begins at step 402, where the first device 110 receives a request to migrate data from the second device 120 during the setup phase of the first device 110. In response to the request, the first device 110 generates a code, at step 404. At step 406, the code is utilized to establish a private wireless network that is hosted by the first device 110. The first device 110 derives wireless network parameters associated with the private wireless network.

At step 408, a connection is established with the second device 120 via the private wireless network. In some embodiments, when the migration application at the second device 120 also derives the wireless network parameters based on the code, the connection between the first device 110 and second device 120 is automatically established via the private wireless network.

At step 410, the first device 110 queries the second device 120 for the data to migrated to the first device 110. At step 412, the first device 110 receives the data records from the second device 120. In some embodiments, the first device 110 receives a summary of data that is available on the second device 120. When the summary of data is collected, the data records containing actual user data are received from the second device 120.

Figure 5:
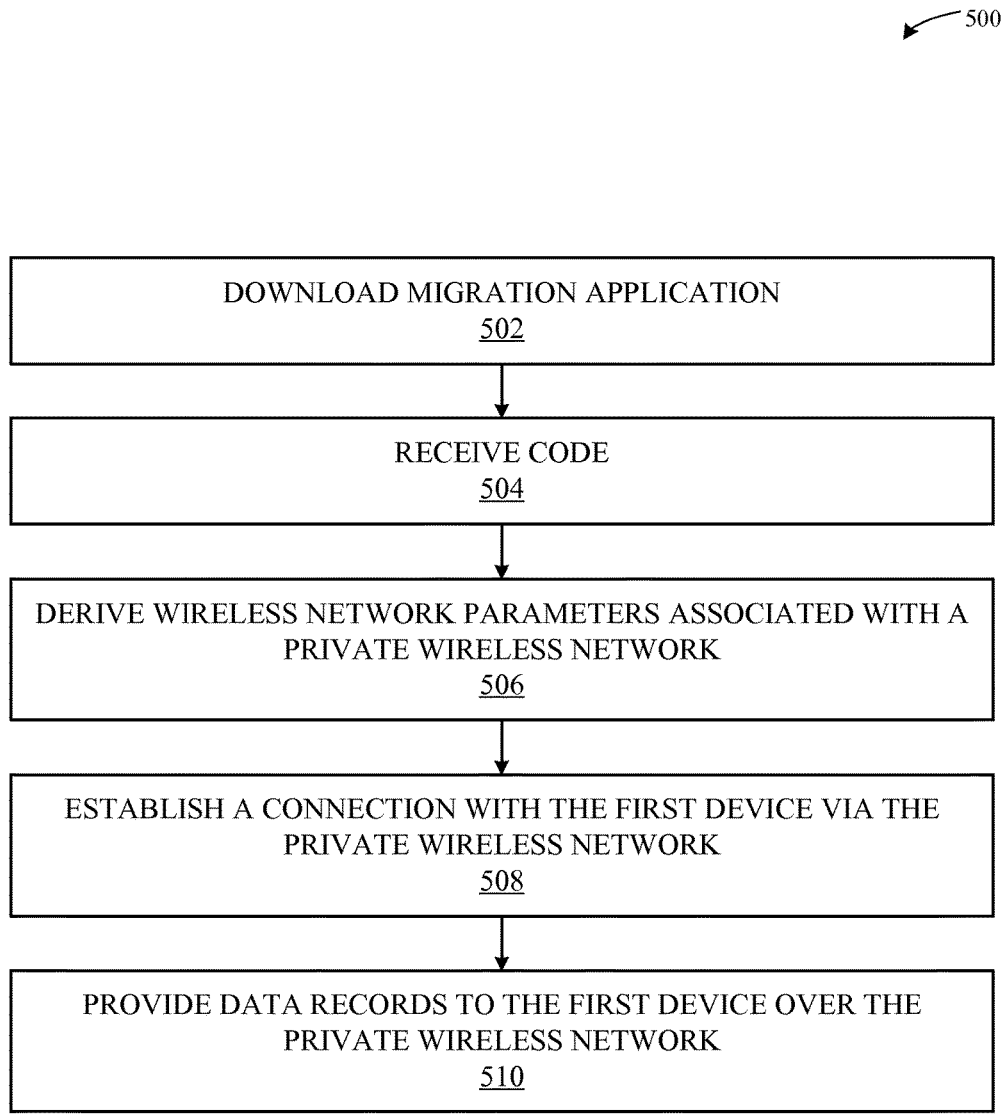
FIG. 5 illustrates a method that is carried out by a migration application executing at the second device of FIG. 1, according to one embodiment.

FIG. 5 illustrates a method 500 carried out by the migration application executing at the second device 120 of FIG. 1, according to one embodiment. As shown, the method 500 begins at step 502, where the migration application is downloaded to the second device 120. When executed at the second device 120, the migration application presents a UI that requests the user to enter the code. At step 504, the migration application receives the code entered by the user via the UI. At step 506, the migration application derives, based on the code, the wireless network parameters associated with the private wireless network hosted by the first device 110.

When the wireless network parameters are derived, the migration application establishes a connection with the first device 110 via the private wireless network, at step 508. At step 510, the migration application responds to any queries/requests for data made by the first device 110. In particular, the summary of data and the data records at the second device 120 are provided to the first device 110 based on the requests.

Figure 6:
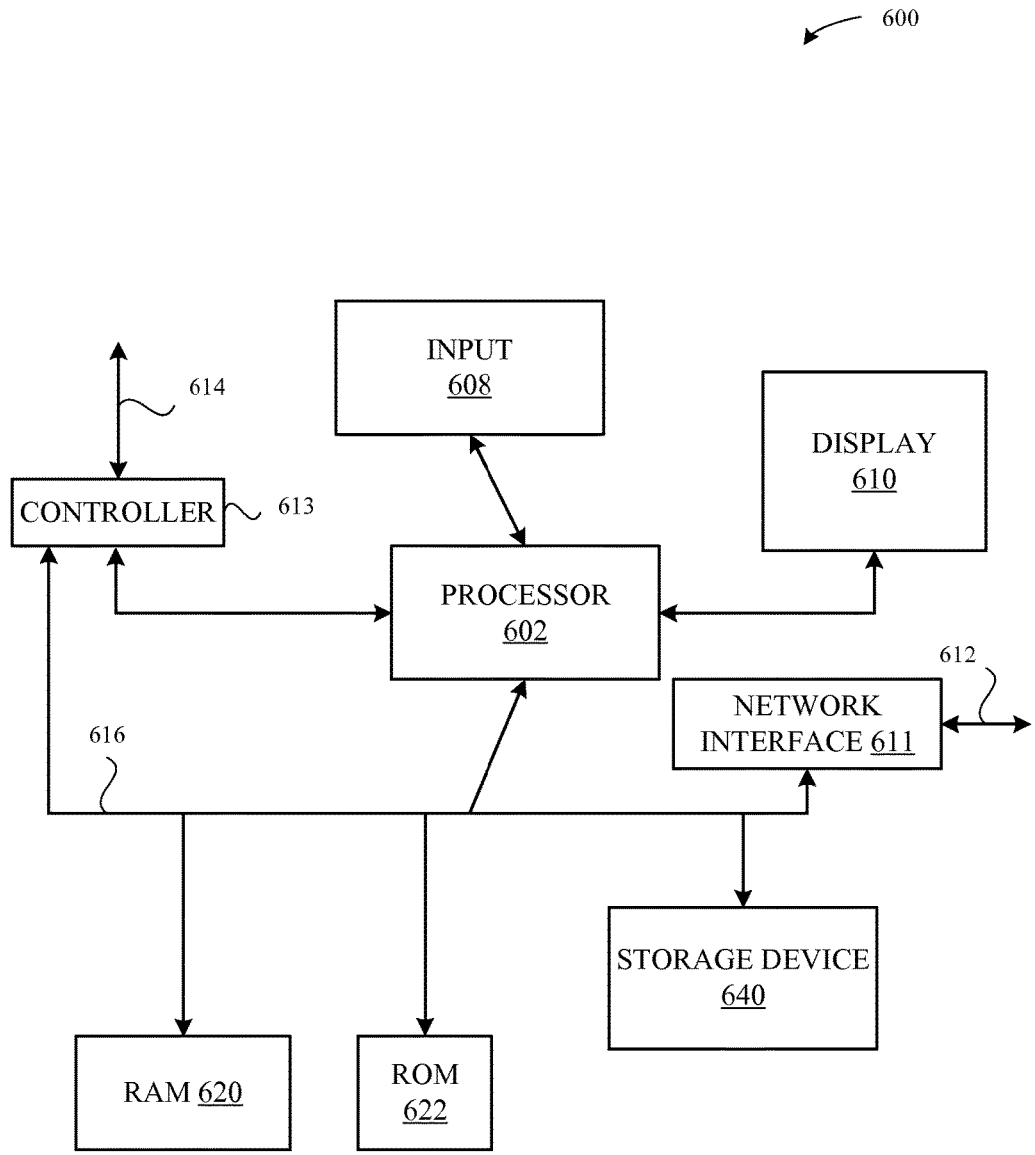
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the first device 110 or second device 120 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for migrating data between a first device and a second device, the method comprising, at the first device:
   receiving a request to migrate the data from the second device;
   in response to the request, generating a code for establishing a private wireless network;
   displaying the code on a display of the first device to provoke the code to be entered at the second device;
   deriving at least one wireless network parameter based on the code;
   establishing the private wireless network based on the at least one wireless network parameter;
   establishing a connection with the second device over the private wireless network;
   querying the second device for the data to be migrated over the connection; and
   receiving, over the connection, one or more data records from the second device in response to the querying.

2. The method of claim 1, wherein the request to migrate the data is received during an initial configuration phase of the first device.

3. The method of claim 1, wherein the private wireless network is local to and hosted by the first device.

4. The method of claim 1, further comprising:
   identifying, based on the one or more data records, at least one application associated with at least one of the one or more data records; and
   displaying an option to download and install the at least one application onto the first device.

5. The method of claim 1, wherein the at least one wireless network parameter includes (i) a wireless network name, and (ii) a pre-shared key.

6. The method of claim 1, wherein querying the second device for the data to be migrated comprises:
   querying the second device for a summary of data that is available at the second device.

7. The method of claim 1, wherein the one or more data records comprise user data managed by the second device.

8. A system for migrating data between a first device and a second device, the system comprising:
   the first device, which:
      receives a request to migrate the data from the second device,
      generates a code for establishing a private wireless network in response to the request,
      displays the code on a display of the first device to provoke the code to be entered at the second device,
      derives at least one wireless network parameter based on the code, and
      establishes the private wireless network based on the at least one wireless network parameter; and
   the second device, which:
      receives an input of the code in conjunction with the code in association with the code being displayed on the display of the first device,
      derives the at least one wireless network parameter based on the code,
      establishes a connection with the first device over the private wireless network, and
      provides one or more data records to the first device in response to one or more requests for the data issued by the first device.

9. The system of claim 8, wherein the request to migrate the data is received during a setup phase of the first device.

10. The system of claim 8, wherein the code comprises a numeric code.

11. The system of claim 8, wherein the private wireless network is local to and hosted by the first device.

12. The system of claim 8, wherein the at least one wireless network parameter includes (i) a wireless network name, and (ii) a pre-shared key.

13. The system of claim 8, wherein the second device:
   receives the input of the code via a migration application executing on the second device.

14. The system of claim 13, wherein the first device:
   identifies, based on the one or more data records, at least one application associated with at least one of the one or more data records; and
   displays an option to download and install the at least one application onto the first device.

15. The system of claim 8, wherein the one or more requests includes a first request for a summary of data available at the second device.

16. The system of claim 8, wherein the one or more requests include a first request for user data available at the second device.

17. The system of claim 8, wherein the first device:
   instructs a user to perform one or more operations at the second device.

18. The system of claim 17, wherein the one or more operations include downloading a migration application from an application store.

19. A non-transitory computer readable storage medium storing instructions that, when executed by a processor included in a first device, cause the first device to manage migration of data from a second device, by carrying out steps that include:
  receiving a request to migrate the data from the second device;
  in response to the request, generating a code for establishing a private wireless network;
  displaying the code on a display of the first device to provoke the code to be entered at the second device;
  deriving at least one wireless network parameter based on the code;
  establishing the private wireless network based on the at least one wireless network parameter;
  establishing a connection with the second device over the private wireless network;
  querying the second device for the data to be migrated over the connection; and
  receiving, over the connection, one or more data records from the second device in response to the querying.

20. The non-transitory computer readable storage medium of claim 19, wherein the private wireless network is local to and hosted by the first device.

* * * * *